United States Patent
Poth et al.

(10) Patent No.: US 6,274,693 B1
(45) Date of Patent: Aug. 14, 2001

(54) METHOD FOR PRODUCING A TWO-LAYER COATING AND SUITABLE ENAMEL THEREFOR

(75) Inventors: Ulrich Poth; Bärbel Wiatr, both of Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/530,667

(22) PCT Filed: Oct. 28, 1998

(86) PCT No.: PCT/EP98/06825

§ 371 Date: May 3, 2000

§ 102(e) Date: May 3, 2000

(87) PCT Pub. No.: WO99/23133

PCT Pub. Date: May 14, 1999

(30) Foreign Application Priority Data

Nov. 4, 1997 (DE) .............................................. 197 48 584

(51) Int. Cl.⁷ .................................................... C08G 18/81
(52) U.S. Cl. ............................ 528/45; 544/224; 560/158; 427/385.5; 427/407.1
(58) Field of Search .............................. 528/45; 544/224; 560/158; 427/385.5, 407.1

(56) References Cited

U.S. PATENT DOCUMENTS

| 4,727,100 | | 2/1988 | Vasta ........................................ 524/40 |
| 5,126,424 | * | 6/1992 | Brindopke et al. .................... 528/45 |
| 5,516,559 | * | 5/1996 | Rockrath et al. .................. 427/407.1 |
| 5,621,063 | | 4/1997 | Wolf et al. ............................. 528/45 |
| 5,849,855 | * | 12/1998 | Usui et al. .............................. 528/45 |

FOREIGN PATENT DOCUMENTS

| 26 39 491 B1 | 9/1976 | (DE) ................................. C09D/3/72 |
| 0 744 423 A1 | 11/1996 | (EP) ............................... C08G/18/80 |

\* cited by examiner

*Primary Examiner*—Rachel Gorr
*Assistant Examiner*—Melanie D. Bagwell

(57) ABSTRACT

The present invention relates to coating materials with hydroxyl-containing polymers and di- and/or polyisocyanates, at least some of whose isocyanate groups are blocked with a mixture of from 30 to 85% by weight of one or more dialkyl malonates in which at least one of the ester radicals is an aliphatic, cycloaliphatic and/or araliphatic secondary alkyl radical having at least 3 carbon atoms and 70 to 15% by weight of at least one other dialkyl malonate. Preparation and the blocked polyisocyanates and coating materials and use of the coating materials is also provided.

16 Claims, No Drawings

METHOD FOR PRODUCING A TWO-LAYER COATING AND SUITABLE ENAMEL THEREFOR

BACKGROUND AND SUMMARY OF THE INVENTION

The present invention relates to coating materials comprising

A) a hydroxyl-containing polymer or a mixture of hydroxyl-containing polymers, and B) one or more blocked di- and/or polyisocyanates at least some of whose isocyanate groups are blocked with dialkyl malonate.

The present invention further relates to the preparation and use of the coating materials and to the preparation of the blocked polyisocyanates used in the coating materials of the invention and to the use thereof in topcoats and clearcoats.

It is known to use blocked polyisocyanates as crosslinkers for stoving enamels. Stoving enamels for industrial use, such as, for example, as topcoat, basecoat or surfacer for automotive OEM finishing, are baked preferably at temperatures from 120 to 140° C. The objective is to provide one-component coating materials which can be cured at very low baking temperatures and which nevertheless are of sufficient stability on storage at room temperature. For this purpose it is common to use coating materials based on hydroxyl-containing binders and on blocked isocyanates as crosslinkers.

It is also known that isocyanates blocked with diethyl malonate react with the OH groups of acrylate copolymers even at very low temperatures of about 80° C. Isocyanates blocked with diethyl malonate, however, are of very low solubility, and/or the stability of their solutions on storage is inadequate.

In order to solve this problem, DE-A-42 04 518 proposed nonaqueous coating materials in accordance with the preamble of the main claim. The use described therein of other blocking agents together with malonic diesters, however, lowers the curing rate and impairs the color number and yellowing resistance of the coatings. Furthermore, the oligomerization of the isocyanate component results in an increase in viscosity of the crosslinker component and thus in a lowering of the attainable solids content of the coating materials.

In addition, DE-A-195 19 396 discloses (cyclo)aliphatic polyisocyanates blocked totally or partly with malonic esters, and their use in coating compositions, where the malonic ester contains at least one tert-butyl group. In comparison to polyisocyanates blocked with diethyl malonate, these polyisocyanates have a deblocking temperature which is reduced by from 10 to 20° C. The use of malonic esters having at least one tert-butyl group as blocking agents, however, has the disadvantage that the stability of the coating material prepared there on storage is inadequate even at room temperature.

DE-C-195 29 124, moreover, discloses coating compositions in connection with which it is essential to the invention that the binder used comprises a mixture of a styrene-containing acrylate copolymer and a styrene-free acrylate copolymer. As crosslinkers, these coating compositions include one or more free or blocked polyisocyanates. In addition to a large number of other blocking agents, dialkyl malonates are also mentioned in DE-C-195 29 124, such as, for example, inter alia, diethyl, diisopropyl, and di-tert-butyl malonate, diethyl malonate being used with preference among these dialkyl malonates.

Furthermore, U.S. Pat. No. 4,677,180 discloses coating compositions which in addition to a hydroxyl-functional binder include blocked isocyanates in which the isocyanate groups are blocked with C1 to C12 alkyl malonates. The only example of suitable malonates mentioned in this document, however, is diethyl malonate. A further disadvantage is that these coating compositions known from U.S. Pat. No. 4,677,180 mandatorily require the addition of a low molecular mass compound having at least 2 OH groups per molecule as a stabilizer.

JP-A-2-242867 describes a basecoat/clearcoat process in which nonaqueous transparent topcoats comprising (A) a hydroxyl-containing synthetic resin, (B) an amino resin, and (C) a blocked polyisocyanate are applied, components (B) and (C) being selected such that the temperature at which a chemical reaction ensues between (A) and (C) should be not more than 20° C. below and not more than 50° C. above the temperature at which a chemical reaction ensues between (A) and (B).

As blocking agents for the preparation of component (C) it is preferred to use aliphatic monoalcohols, oximes, and caprolactams. However, suitable blocking agents mentioned also include malonic esters. The transparent topcoats described in JP-A-2-242 867 provide paint systems which in respect in particular of their resistance to organic solvents and acids, their gloss, their transparency, and their resistance to yellowing are deserving of improvement.

Finally, DE-A-23 42 603 describes a process for preparing polyisocyanates blocked with dialkyl malonates having 1 to 4 carbon atoms in the alcohol residue, and the use of the blocked isocyanates in coating materials. Further details on the composition of the coating materials and their use, however, are not contained in D-A-23 42 603.

The present invention is therefore based on the object of providing coating materials where both the finished one-component coating material and the crosslinker used have an adequate stability on storage and where the coating materials are at the same time curable at very low temperatures. This means that in the case of storage of the finished one-component coating material at room temperature for 6 months a viscosity increase of less than 10% occurs or that on storage of the crosslinker for prolonged periods of up to 2 years or more there is no significant viscosity increase.

Furthermore, the coating materials should ensure only a minimal yellowing tendency on baking and also good acid resistance, scratch resistance and high gloss of the resulting coatings. Finally, the coating materials should be suitable for producing multicoat paint systems and in particular should meet the requirements commonly imposed in the sector of automotive OEM finishing.

This object is surprisingly achieved by the coating materials of the types specified at the outset, wherein the isocyanate groups of component (B) are blocked using a mixture of dialkyl malonates comprising b1) from 30 to 85% by weight of one or more dialkyl malonates of the general formula (I)

and/or one or more dialkyl malonates of the general formula (II)

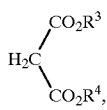

(II)

where

R¹, R² and R³ are each identical or different aliphatic and/or cycloaliphatic and/or araliphatic secondary alkyl radicals having at least 3 carbon atoms, and R⁴ is an aliphatic, cycloaliphatic, aromatic or araliphatic hydrocarbon radical, and b2) from 70 to 15% by weight of one or more dialkyl malonates other than component (b1), the sum of the weight fractions of components (b1) and (b2) being in each case 100% by weight.

The present invention further relates to the preparation and use of the coating materials and to the preparation of the blocked polyisocyanates used in the coating materials of the invention and to the use thereof in topcoats and clearcoats.

It is surprising and could not have been foreseen that the partial use of dialkyl esters of malonic acid with secondary alcohols instead of dimethyl malonate and/or diethyl malonate as blocking agents for polyisocyanates leads to coating materials which are notable for improved yellowing resistance of the resulting coatings (especially to yellowing occurring due to high baking temperatures and/or due to long baking times). A further advantage is that the use of malonic diesters of secondary alcohols improves the solubility and compatibility of the blocked polyisocyanate.

Another advantage is that the coating materials of the invention can be cured at low baking temperatures to coatings having good acid resistance and scratch resistance. Moreover, the blocked polyisocyanates used in accordance with the invention are simple and inexpensive to prepare. Finally, the coating materials of the invention are suitable for producing multicoat paint systems, meet the requirements commonly imposed in the sector of automotive OEM finishing, and can also be processed well with a low level (e.g., less than 50% by weight) of organic solvents.

DETAILED DESCRIPTION OF THE INVENTION

In the text below, first of all, the coating materials of the invention are elucidated more closely.

As component (A) it is possible in principle to use any synthetic resin which contains hydroxyl groups and is suitable for transparent topcoats, or a mixture of such synthetic resins. The resins are preferably selected such that component (A) has an OH number of from 40 to 240 mg KOH/g, with particular preference from 60 to 150 mg KOH/g. As component (A) it is preferred to use hydroxyl-containing polyester resins and/or hydroxyl-containing alkyd resins and/or hydroxyl-containing polyacrylate resins, and mixtures of these resins. The synthetic resins used as component (A) generally have number-average molecular weights of from 1500 to 30,000, preferably from 2000 to 15,000, with particular preference from 2500 to 7500.

Hydroxyl-containing polyester resins, alkyd resins and polyacrylate resins are well known. Examples of such resins and their preparation are described, for example, in JP-A-2-24 28 67, DE-B-26 39 491, EP-A-403 044, U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719, 132, EP-A-297 576, EP-A-69 936, EP-A-89 497, EP-A-195 931, EP-A-228 003, EP-A-38 127 and DE-A-28 18 100.

Also suitable as component (A) are the hydroxy-functional compounds specified in European Patent Application EP-A-767 185 and in US Patents U.S. Pat. No. 5,480,943, U.S. Pat. No. 5,475,073, and U.S. Pat. No. 5,534,598.

As component (A) it is particularly preferred to use polyacrylate resins preparable by polymerizing (a) from 10 to 92, preferably from 20 to 60% by weight of an alkyl or cycloalkyl acrylate or of an alkyl or cycloalkyl methacrylate having 1 to 18, preferably 4 to 13 carbon atoms in the alkyl or cycloalkyl radical, or mixtures of such monomers, (b) from 8 to 60, preferably from 12.5 to 38.5% by weight of a hydroxyalkyl acrylate or of a hydroxyalkyl methacrylate having 2 to 4 carbon atoms in the hydroxyalkyl radical, or mixtures of such monomers, (c) from 0.0 to 5.0, preferably from 0.7 to 3.0% by weight of acrylic acid or methacrylic acid, or mixtures of these monomers, and (d) from 0 to 50, preferably from 0 to 30% by weight of ethylenically unsaturated monomers different than the copolymerizable (a), (b) and (c), or mixtures of such monomers to polyacrylate resins having hydroxyl numbers of from 40 to 240, preferably from 60 to 150, acid numbers of from 0 to 35, preferably from 5 to 20, glass transition temperatures of from −35 to +70° C., preferably from −20 to +40° C., and number-average molecular weights of from 1500 to 30,000, preferably from 2000 to 15,000 (determined by gel permeation chromatography with polystyrene standard).

Examples of components (a) are methyl, ethyl, propyl, n-butyl, isobutyl, tert-butyl, pentyl, hexyl, heptyl and 2-ethylhexyl acrylate and methacrylate and also cyclohexyl acrylate, cyclohexyl methacrylate, tert-butylcyclohexyl acrylate, tert-butylcyclohexyl methacrylate, isobornyl acrylate, and isobornyl methacrylate.

Examples of components (b) are hydroxyethyl, hydroxypropyl and hydroxybutyl acrylate and ethacrylate.

Examples of components (d) are vinylaromatics, such as styrene, vinyltoluene, α-methylstyrene, α-ethylstyrene, ring-substituted diethylstyrenes, isopropylstyrene, butylstyrenes and methoxystyrenes, for example; vinyl ethers, such as ethyl vinyl ether, n-propyl vinyl ether, isopropyl vinyl ether, n-butyl vinyl ether and isobutyl vinyl ether, for example, and vinyl esters, such as vinyl acetate, vinyl propionate, vinyl butyrate, vinyl pivalate and the vinyl ester of saturated, aliphatic monocarboxylic acids having 9 to 11 carbon atoms and having a tertiary α carbon atom (VeoVa® 9, VeoVa® 10, VeoVa® 11 and the like), for example.

The hydroxyl number and the acid number of the polyacrylate resins can easily be controlled by the skilled worker through the amount of component (b) and/or (c) used.

The glass transition temperature of the polyacrylate resins is determined by the nature and amount of the monomers used. The monomers can be selected by the skilled worker with the aid of the following formula, with which the glass transition temperatures of polyacrylate resins can be calculated approximately:

$$\frac{1}{T_g} = \sum_{n=1}^{n=x} \frac{W_n}{T_{gn}}$$

$T_g$ = glass transition temperature of the polyacrylate resin $x$ = number of different monomers copolymerized in the polyacrylate resin $W_n$ = weight fraction of the $n$th monomer $T_{gn}$ = glass transition temperature of the homopolymer of the $n$th monomer Measures for controlling the molecular weight (e.g., selection of appropriate polymerization initiators, use of chain transfer agents, etc.) are part of the technical knowledge of the average skilled worker and need not be elucidated further here.

As component (A) it is also particularly preferred to use polyester resins or alkyd resins preparable by reacting,
(α) a cycloaliphatic or aliphatic polycarboxylic acid, or a mixture of such polycarboxylic acids,
(β) if desired, one or more aromatic polycarboxylic acids,
(γ) an aliphatic or cycloaliphatic polyol having more than two-hydroxyl groups in the molecule, or a mixture of such polyols, and
(δ) an aliphatic or cycloaliphatic diol, or a mixture of such diols, and
(ε) if desired (in the case of alkyd resins), an aliphatic linear or branched saturated monocarboxylic acid, or a mixture of such monocarboxylic acids,
in a molar ratio of ((α)+(β)):(γ):(δ):(ε)=1.0:0.2–1.3:0.0–1.1: 0.0–1.4, preferably 1.0:0.5–1.2:0.0–0.6:0.2–0.9, to give a polyester resin or alkyd resin, respectively.

Examples of component (α) are hexahydrophthalic acid, 1,4-cyclohexanedicarboxylic acid, endomethylene-tetrahydrophthalic acid, malonic acid, succinic acid, glutaric acid, adipic acid, pimelic acid, suberic acid, azelaic acid and sebacic acid.

Together with the cycloaliphatic and/or aliphatic polycarboxylic acids it is possible as component (β) to use, if desired, aromatic polycarboxylic acids, such as phthalic acid, isophthalic acid, terephthalic acid, halophthalic acids, such as tetrachloro- and tetrabromophthalic acid, trimellitic acid, pyromellitic acid and the like, for example.

Examples of component (γ) are pentaerythritol, trimethylolpropane, trimethylolethane and glycerol.

Examples of component (δ) are ethylene glycol, diethylene glycol, propylene glycol, neopentyl glycol, 2-methyl-2-propyl-1,3-propanediol, 2-ethyl-2-butyl-1,3-propandiol, 2,2,4-trimethyl-1,5-pentanediol, 2,2,5-trimethyl-1,6-hexanediol, neopentyl glycol hydroxypivalate, and dimethylolcyclohexane.

Examples of component (ε) are 2-ethylhexanoic acid, lauric acid, isooctanoic acid, isononanoic acid, and monocarboxylic acid mixtures obtained from coconut oil or palm kernel oil.

The preparation of hydroxyl-bearing polyester resins and-or alkyd resins is described, for example, in Ullmanns Encyklopädie der technischen Chemie, 3rd Edition, volume 14, Urban & Schwarzenberg, Munich, Berlin 1963, pages 80 to 89 and pages 99 to 105, and in the following books: Résines Alkydes-Polyesters by J. Bourry, Paris, Dunod 1952, Alkyd Resins by C. R. Martens, Reinhold Publishing Corporation, New York 1961, and Alkyd Resin Technology by T. C. Patton, Interscience Publishers 1962.

It is essential to the invention that the coating materials comprise as crosslinking component (B) one or more di- and/or polyisocyanates where the isocyanate groups are blocked using a mixture of dialkyl malonates consisting of
b1) from 30 to 85% by weight, preferably from 50 to 70% by weight, of one or more dialkyl malonates of the general formula (I)

(I)

and/or one or more dialkyl malonates of the general formula (II)

(II)

where
R$^1$, R$^2$ and R$^3$ are each identical or different aliphatic and/or cycloaliphatic and/or araliphatic secondary alkyl radicals having at least 3 carbon atoms, and
R$^4$ is an aliphatic, cycloaliphatic, aromatic or araliphatic hydrocarbon radical,
and
b2) from 70 to 15% by weight, preferably from 50 to 30% by weight, of one or more dialkyl malonates other than component (b1),
the sum of the weight fractions of components (b1) and (b2) being in each case 100% by weight.

It is preferred to use as component (b1) dialkyl malonates of the formula (I). Preferably, R$^1$, R$^2$ and R$^3$ are secondary alkyl radicals having 3 to 18 carbon atoms and with particular preference having not more than 8 carbon atoms. The radical R$^4$ preferably has from 1 to a maximum of 18 carbon atoms, with particular preference from 1 to 10 carbon atoms.

Suitable blocking agents (b1) of the formulae (I) and (II) used in accordance with the invention are esters of malonic acid with aliphatic and/or cycloaliphatic and/or aromatic secondary alcohols, especially esters of malonic acid with 2-propanol, 2-butanols, such as 2-butanol, 3,3-dimethyl-2-butanol, 2-pentanols, such as esters with 3-methyl-2-pentanol, 4-methyl-2-pentanol, 3-pentanols, such as 3-pentanol, 2-methyl-3-pentanol, 1-phenyl-3-pentanol, 2,2-dimethyl-3-pentanol, 2,4-dimethyl-3-pentanol, 2-hexanols, such as 2-hexanol, 3-methyl-2-hexanol, 5-methyl-2-hexanol, 3-hexanols, such as 3-hexanol, 2,4-dimethyl-3-hexanol, 5-methyl-3-hexanol, secondary nonanols, secondary decanols and secondary tridecyl alcohols and the like. It is also possible in each case to use mixed esters of malonic acid as blocking agents.

Dialkyl malonates of secondary alcohols that are used are preferably the malonic esters of isopropanol, 2-butanols, 2-pentanols and 3-pentanols, with very particular preference to 2-propanol, 2-butanol, 2-pentanol and 3-pentanol.

The dialkyl malonates of secondary alcohols are used in accordance with the invention together with one or more other dialkyl malonates (b2). As an example of these other dialkyl malonates (b2) mention may be made of esters of malonic acid with tertiary alcohols, but in particular with primary alcohols, such as methanol, ethanol, n-propanol, n-butanols, isobutanols, n-pentanols, isopentanols, n-hexanols, isohexanols, 2-ethylhexanol, isononanols, isodecanols, isotridecyl alcohols, fatty alcohols, benzyl alcohol, and the like. It is again also possible in each case to use mixed esters of malonic acid as blocking agents (b2).

Particular preference is given in accordance with the invention to the use of a mixture of b1) malonic ester(s) of isopropanol, 2-butanols, 2-pentanols and/or 3-pentanols, and b2) dimethyl malonate and/or diethyl malonate.

Very particular preference is given in accordance with the invention to the use of a mixture of
b1) diisopropyl malonate and/or di-sec-butyl malonate, and
b2) dimethyl malonate and/or diethyl malonate.

In principle, all polyisocyanates which can be used in the coatings sector can be used to prepare component (B). It is preferred, however, to use polyisocyanates whose isocyanate groups are attached to aliphatic or cycloaliphatic radicals. Examples of polyisocyanates of this kind are hexamethylene diisocyanate, isophorone diisocyanate, trimethylhexa-methylene diisocyanate, dicyclohexylmethane diiso-cyanate and 1,3-bis(2-isocyanatoprop-2-yl) benzene (TMXDI) and mixtures thereof, or oligomers derived from these isocyanates. Examples of suitable oligomers of these polyisocyanates are adducts with polyols, especially low molecular mass polyols, such as trimethylolpropane, for example, or polyester polyols and/or polyether polyols, and polyisocyanates which are derived from these polyisocyanates and contain isocyanurate groups and/or biuret groups and/or allophanate groups and/or uretdione groups and/or carbodiimide groups, or mixtures of such compounds.

Polyisocyanates used for particular preference are hexamethylene diisocyanate and/or isophorone diisocyanate, polyisocyanates which are derived from these diisocyanates, contain isocyanurate or biuret groups and contain preferably more than two isocyanate groups in the molecule, and reaction products of hexamethylene diisocyanate and isophorone diisocyanate, or of a mixture of hexamethylene diisocyanate and isophorone diisocyanate, with 0.3–0.5 equivalents of a low molecular mass polyol having a molecular weight of from 62 to 500, preferably from 104 to 204, in particular a triol, such as trimethylol propane, for example.

Component (B) can be prepared, for example, by reacting a polyisocyanate or a mixture of polyisocyanates in a manner known per se with the mixture of one or more malonic esters (b1) and one or more different dialkyl malonates (b2). All that is essential in this case is that the amounts of the individual dialkyl malonates are chosen such that from 30 to 85% by weight, preferably from 50 to 70% by weight, of the dialkyl malonate used to block the isocyanate groups of component (B) comprise one or more dialkyl malonates of the formulae (I) and/or (II).

The reaction of the polyisocyanate or of the mixture of polyisocyanates takes place in a known manner at temperatures which in general lie between 50 and 130° C. This reaction can be conducted in nonprotic solvents, such as aromatic hydrocarbons, esters, ketones, glycol ether esters, aliphatic and/or cycloaliphatic hydrocarbons, for example. The reaction normally takes place in the presence of basic catalysts, such as alkali metal alkoxides, alkali metal phenoxides, or alkali metal salts of alkane carboxylic acids and/or derivatives thereof, preferably sodium salts of said compounds.

The polyisocyanate or the mixture of polyisocyanates can be reacted with the malonates until the desired NCO equivalent weight is reached. The reaction can in this case be continued until isocyanate groups are no longer detectable. In practice, this may necessitate the use of very large excesses of blocking agents and/or very long reaction times.

It has now been found that coating materials having the good properties described above are also obtained when at least 50%, preferably at least 90%, of the isocyanate groups of the polyisocyanate or of the mixture of polyisocyanates are reacted with the malonates and the remaining isocyanate groups are reacted with a hydroxyl-containing compound or a mixture of hydroxyl-containing compounds. As hydroxyl-containing compounds it is preferred to use low molecular mass aliphatic or cycloaliphatic polyols, such as neopentyl glycol, dimethylolcyclohexane, ethylene glycol, diethylene glycol, propylene glycol, 2-methyl-2-propyl-1,3-propane diol, 2-ethyl-2-butyl- 1,3-propanediol, 2,2,4-trimethyl-1,5-pentanediol and 2,2,5-trimethyl-1,6-hexanediol or the hydroxyl-containing synthetic resins which can be used as component (A).

Component (B) is also obtainable by mixing polyisocyanates, blocked with different malonic esters, in a ratio such as to give a mixture in which the abovementioned ratio of the malonic esters with secondary alcohols is ensured. This procedure for preparing component (B) is less preferred.

It has surprisingly been found that the polyisocyanates blocked with dialkyl malonates of higher alcohols are particularly easy to prepare by
1.) reacting at least some of the isocyanate groups of the di- and/or polyisocyanate with dimethyl malonate and/or diethyl malonate,
2.) if desired, reacting the reaction product obtained in stage (1) with a hydroxyl-containing compound or a mixture of hydroxyl-containing compounds, and
3.) reacting the reaction product obtained in stage (1) or (2) with an aliphatic and/or cycloaliphatic and/or aromatic alcohol having at least 3 carbon atoms, preferably secondary alcohols, or with a mixture of such alcohols.

This process is preferably used to prepare the dialkyl malonates of the formulae (I) and (II) and the blocked isocyanates prepared by means of this process are preferably used as component (B) in the coating materials of the invention.

Stage (1) of the process is known and is described, for example, in DE-A-42 04 518. The reaction conditions generally correspond to the conditions specified above for the reaction with the malonic esters of secondary alcohols.

It is particularly preferred in stage (1) of the process to react only some of the isocyanate groups of the di- and/or polyisocyanate with dimethyl malonate and/or diethyl malonate; in other words, for the reaction product to be obtained in stage (1) to still have free isocyanate groups.

This reaction product obtained in stage (1) and having free isocyanate groups can then be reacted in a particularly preferred process with a hydroxyl-containing compound or with a mixture of hydroxyl-containing compounds (stage (2) of the process). Hydroxyl-containing compounds used are of preferably low molecular mass aliphatic or cycloaliphatic polyols, polyester polyols and/or polyether polyols. Examples of suitable compounds are the compounds already mentioned in connection with the description of polyisocyanates, and the synthetic resins listed as component (A). In the case of this particularly preferred process, it is also possible in stage (1) to start from a diisocyanate and to conduct the oligomerization to a urethane or the like after the partial blocking (stage (1)) in this stage (2).

The reaction product obtained in stage (1) or (2) is then reacted in stage (3) of the process with the desired alcohol (aliphatic and/or cycloaliphatic and/or aromatic alcohol having more than 2 carbon atoms or a mixture of such alcohols, preferably secondary alcohol). This reaction (transesterification) takes place usually at temperatures between 80 and 150° C., preferably between 110 and 130° C. The methanol and/or ethanol evolved in the course of this transesterification is generally removed by distillation. If the reaction product used in stage (3) still has free isocyanate groups, then the transesterification is of course accompanied by urethanization. With said higher alcohols, this urethanization proceeds more rapidly than the transesterification. It has also been found that in general a transurethanization, with elimination of the malonic ester, takes place only to a limited extent. Furthermore, it is possible to conduct the transesterification reaction such that only portions of the original dimethyl malonate and/or diethyl malonate are transesterified.

Components of (A) and (B) are used in the coating materials of the invention preferably in amounts such that the ratio of equivalents of the hydroxyl groups of component (A) to the isocyanate groups of component (B) is between 1.6:1 and 0.7:1, preferably between 1.3:1 and 0.9:1.

Furthermore, the coating materials of the invention can if desired also comprise one or more further crosslinkers, examples being amino resins, or polyisocyanates blocked with other blocking agents, as component (C).

As component (C) it is possible in principle to use any amino resin, but especially any amino resin suitable for transparent topcoats, or a mixture of such amino resins.

Resins of this kind are well known to the skilled worker and are offered as commercial products by many companies. Amino resins are products of the condensation of aldehydes, especially formaldehyde, and, for example, urea, melamine, guanamine and benzoguanamine. The amino resins contain alcohol groups, preferably methylol groups, which in general are partly or, preferably, fully esterified with alcohols.

As component (C) it is preferred to use melamine-formaldehyde resins esterified with low alcohols, especially with methanol or butanol. Particular preference is given to melamine-formaldehyde resins esterified with low alcohols, especially with methanol and/or butanol, and on average still containing per triazine ring from 0.1 to 0.25 hydrogen atoms attached to nitrogen atoms.

As component (C) it is possible to use triazine-based components which crosslink with the hydroxyl groups of the binder to form esters. The triazine-based crosslinkers which react with the hydroxyl groups of the binder to form ester groups comprise transesterification crosslinkers, such as preferably tris(alkoxycarbonylamino)triazine or the like, as also described, for example, in EP-A-604 922.

If the coating materials include component (C), said component (C) is normally used in an amount of from 3 to 30% by weight, preferably from 10 to 15% by weight, based on the weight of the binder. If the coating materials include component (C), the respective amount of the crosslinker (B) used is reduced accordingly; that is, it is generally reduced by about half the amount.

The coating materials of the invention can be formulated as aqueous or, in particular, as solventborne, liquid coating materials. If the coating materials are formulated as aqueous coating materials, the customary methods are used in order to be able to disperse the blocked polyisocyanates stably in the aqueous phase. This can be done in a manner known to the skilled worker using, for example, a carrier resin, by the use of emulsifiers, or by incorporating hydrophilic groups, such as acid groups, for example.

As organic solvents, the nonaqueous coating materials include customary organic solvents commonly used to prepare coating materials, in customary amounts.

It is also possible, however, if the glass transition temperature of the blocked polyisocyanates and the glass transition temperature of component (A) is sufficiently high (in general higher than 80° C.), to formulate the coating materials of the invention as powder coating materials or as powder slurries (aqueous dispersions of systems initially prepared in the form of mixtures of solids).

The coating materials of the invention may also include further additives common for the respective formulation, such as stabilizers, for example, such as light stabilizers, antioxidants and free-radical scavengers, leveling assistants, rheology additives, flow aids, etc., preferably in an amount of from 0.2 to 5.0% by weight, based on the overall weight of the coating material.

The coating materials of the invention if desired also include customary pigments and/or fillers. The amount of pigments and/or fillers used is generally chosen such that the coloration required is achieved in film thicknesses of from 25 to 50 $\mu$m. The amount is therefore generally from 0.9 to 30% by weight, based on the overall weight of the coating material. If they are used as transparent top coats, they contain no pigments or only transparent pigments.

The coating materials of the invention are also suitable for producing multicoat paint systems. In this utility they can be used as basecoats and, preferably as clearcoats. The present invention therefore also relates to a process for producing a multicoat paint system where (1) a pigmented basecoat is applied to the substrate surface,
(2) a polymer film is formed from the basecoat applied in stage (1),
(3) a nonaqueous transparent topcoat is applied to the basecoat thus obtained, and subsequently
(4) basecoat and topcoat are baked together, wherein the basecoat and/or the topcoat are/is a coating material of the invention.

In stage (1) of the process of the invention it is possible, besides the coating materials of the invention, to use in principle any pigmented basecoat suitable for producing two-coat paint systems. Basecoats of this kind are well known to the skilled worker. It is possible to use both water-thinnable basecoats and basecoats based on organic solvents. Appropriate basecoats are described, for example, in U,S. Pat. No. 3,639,147, DE-A-33 33 072, DE-A-38 14 853, GB-A-2-012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100. These patent documents also contain further information on the basecoat/clearcoat process in question.

In stage (2) of the process of the invention the solvents and/or the water are or is removed, in an evaporation phase, from the basecoat applied in stage (1). The basecoat film can also be baked, although this is disadvantageous on economic grounds since then two baking operations rather than one are required to produce the two-coat paint system.

In stage (3) of the process of the invention the transparent topcoat of the invention is used.

The two-coat paint systems produced with the topcoats used in accordance with the invention feature the advantageous properties in particular when they have been baked under the baking conditions currently employed in automotive OEM finishing (30 minutes at 110° C. to 10 minutes at 150° C., preferably 30 minutes at 130° C.).

However, the coating materials of the invention can of course also be used for other coating systems. They can therefore also be applied to other substrates, such as metal, wood or paper, for example. Application takes place with the aid of customary methods, such as spraying, knife coating, rolling, dipping or brushing, for example.

With nonaqueous coating materials of the invention it is also possible to coat primed or unprimed plastics such as, for example, ABS, AMMA, ASA, CA, CAB, EP, UF, CF, MF, MPF, PF, PAN, PA, PC, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations as per DIN 7728T1). The plastics to be coated can of course also be polymer blends, modified plastics, or fiber-reinforced plastics. They can also be used for the coating of plastics which are commonly used in vehicle construction, especially motor vehicle construction. The prerequisite is of course, however, in each case that the substrates withstand the baking temperatures of, for example, 90° C. for 45 minutes.

In the case of nonfunctionalized and/or nonpolar substrate surfaces, the surfaces must be subjected prior to coating in a known manner to a pretreatment, such as plasma or flame treatment.

The invention is elucidated more closely in the examples below. All amounts and percentages, unless expressly stated otherwise, are to be understood as being by weight.

1. Preparing an Acrylate Resin Solution (Component (A))

870 g of a commercially customary solvent comprising a fraction of aromatic hydrocarbons having a boiling range from 158° C. to 172° C. under atmospheric pressure are weighed out into a double wall laboratory stainless steel reactor equipped with a reflux condenser, a heating system controllable by means of an oil circulation thermostat, a blade stirrer with a stirrer, a thermometer for monitoring the temperature of the reaction material, an inlet pipe for a flow of protective nitrogen gas, and one metering vessel each for a monomer mixture and an initiator solution. The solvent is heated to 140° C. with stirring. Then a solution of 87 g of tert-butyl per-2-ethylhexanoate in 87 g of aromatic solvent described above is metered into the reactor from the metering vessel for the initiator solution at a uniform rate and over the course of 0.75 h. 0.25 h after the start of the addition of initiator, a mixture of 291 g of styrene, 367 g of n-butyl acrylate, 364 g of n-butyl methacrylate, 405 g of 2-hydroxypropyl acrylate and 29.0 g of acrylic acid is metered into the reactor from the metering vessel for the monomer mixture at a uniform rate over the course of 4 h. The temperature is held at 140° C. After the end of the addition of initiator the reaction material is held at 140° C. for a further 1.5 hours, then the degree of conversion is determined by a multiple determination in nonvolatile fraction of the reactive mixture (in a circulating-air oven at 180° C. for 15 minutes) and determination of the viscosity. The resulting polymer solution has a nonvolatile fraction (measured in a circulating-air oven at 130° C. for 60 minutes) of 60.2%. The polymer has an acid number of 21.6 mg KOH/g, an OH number of 120 mg KOH/g (both based on the nonvolatile fraction) and a solution viscosity of 825 mPa·s, measured on the described solution in an ICI cone and plate viscometer at 23° C.

2. Preparing Different Crosslinker Components (B)

2.1. Preparing a Blocked Polyisocyanate (B1)

869.0 g of a commercially customary isocyanurate trimer of hexamethylene diisocyanate and 558.0 g of the aromatic solvent described in section 1 are weighed out into the apparatus described in section 1, equipped with a metering vessel and a reflux condenser. The solution is heated to 50° C. with stirring. Then a mixture of 891.0 g of diisopropyl malonate and 7.5 g of a 50% strength solution of sodium p-dodecylphenoxide in xylene is metered into the solution from the metering vessel within a period of 1.5 hours at a rate such that the temperature does not exceed 70° C. Following the addition, the temperature is held at 70° C. for 3 hours. Then a further 2.5 g of sodium p-dodecylphenoxide solution are added and the mixture is held at 70° C. until the NCO equivalent weight reaches 13,000. Then 175 g of n-butanol are added and the mixture is stirred at 70° C. for 30 minutes and then cooled. The resulting solution has a nonvolatile fraction of 47.1% (measured in a circulating-air oven at 130° C. for 60 minutes) and a viscosity of 345 mPa·s measured in an ICI cone and plate viscometer at 23° C. The potential NCO equivalent weight of the solution is 598 g/mol.

2.2. Preparing a Blocked Polyisocyanate (B2)

871.0 g of a commercially customary isocyanurate trimer of hexamethylene diisocyanate are weighed out into the apparatus described in section 1, equipped with a metering vessel and a reflux condenser, and are heated to 50° C. with stirring. Then a mixture of 844.0 g of diethyl malonate and 5 g of a 50% strength solution of sodium p-dodecylphenoxide in xylene is metered into the solution from the metering vessel over a period of 1.5 hours at a rate such that the temperature does not exceed 70° C. Following the addition, the temperature is held at 70° C. for 3 hours. Then a further 2.5 g of sodium p-dodecylphenoxide solution are added and the mixture is held at 70° C. until the NCO equivalent weight reaches 7500.

Then a distillation bridge and column with overhead temperature measurement is mounted on the reactor. Then 689 g of 2-butanol and 303 g of the aromatic solvent described in section 1 are added and the temperature is slowly raised to 130° C. A total of 430 g is distilled off from the reaction mixture. The resulting solution of the polyisocyanate, which is partially blocked with esters of malonic acid with 2-butanol, has a nonvolatile fraction of 53.4% (measured in a circulating-air oven at 130° C. for 1 h) and a viscosity of 1600 mPa·s, measured in an ICI cone and plate viscometer at 23° C. The potential NCO equivalent weight of the solution is 537 g/mol. A GC analysis of a physically predried sample from a reaction with OH polymer yields as elimination products not only small fractions of the malonates but also ethanol and 2-butanol in a molar ratio of 23:77.

2.3. Preparing a Blocked Polyisocyanate (B3)

The procedure followed is similar to the preparation of the blocked polyisocyanate B1 with the sole difference that instead of the diisopropyl malonate now 758 g of diethyl malonate are added. Dilution results in a blocked polyisocyanate having a nonvolatile fraction of 51% (measured in a circulating-air oven at 130° C. for 1 h) and a viscosity of 495 mPa·s, measured in an ICI cone and plate viscometer at 23° C. The potential NCO equivalent weight of the solution is 534 g/mol.

EXAMPLES 1 and 2

Comparative Example V1

The coating materials of Examples 1 and 2 and of Comparative Example 1 are prepared as follows from the components indicated in Table 1. The above-described acrylate resin is mixed with 1.) a mixture of the blocked polyisocyanate B1 and the blocked polyisocyanate B3 (Example 1) and 2.) the blocked polyisocyanate B2 (Example 2) and 3.) the blocked polyisocyanate B3 (Comparative Example 1) such that the ratio of OH groups of the acrylate resin to the blocked isocyanate groups is 1:1. It is then diluted with a mixture, described in Table 1, of the aromatic solvent described in section 1, butyl acetate and butanol, to a nonvolatile fraction of 50.0%. 0.5% of a commercially customary leveling agent comprising a modified silicone fluid, dissolved 5% strength in xylene, is added.

A commercially customary aqueous basecoat as described in EP-A-089 497 is applied in two spray passes with a flashoff time of 1 minute in between so as to give a dry film thickness of 14 μm to steel panels coated with a commercially customary cationically deposited electrodeposition coating material and a commercially customary solvent-borne surfacer based on polyester and melamine resin. The panels are then flashed off at room temperature for 5 minutes and then in two spray passes the coating material of Examples 1 and, respectively, 2 and, respectively, of Comparative Example V1 are applied so as to give a dry film thickness of 40 μm. The panel is flashed off at room temperature for 5 minutes and then baked at 130° C. for 30 minutes.

The solution of the mixture of the blocked polyisocyanate B1 and B3 and the solution of the blocked polyisocyanate B2 are stable for more than 6 months on storage at room temperature. The solution of the blocked polyisocyanate B3 crystallizes after a few days of storage at room temperature.

The coating materials with the mixture of the blocked polyisocyanates B1 and B3, and the coating material of the blocked polyisocyanate B2, are stable following storage for 3 weeks at a temperature of 40° C. and they exhibit only a slight increase in viscosity. The coating material with the blocked polyisocyanate B3 is cloudy after 1 week of storage at a temperature of 40° C. and exhibits a relatively sharp increase in viscosity.

The clearcoat films of Examples 1 and 2 are highly acid-resistant, show no marked yellowing over a silver-colored basecoat, and are scratch resistant. The clearcoat film of the Comparative Example 1 is less yellowing resistant, less hard and less glossy.

TABLE 1

Composition of the coating materials

| | Example 1 | Example 2 | Comparative Example 1 |
|---|---|---|---|
| Acrylate (A) | 52.12 | 53.36 | 53.10 |
| Crosslinker (B1) | 20.06 | — | — |
| Crosslinker (B2) | — | 36.89 | — |
| Crosslinker (B3) | 17.91 | — | 36.50 |
| Aromat. Solv. | 6.94 | 6.82 | 7.28 |
| BA | 1.98 | 1.95 | 2.08 |
| n-Bu | 0.99 | 0.98 | 1.04 |
| Total | 100.00 | 100.00 | 100.00 |
| Silicone fluid | 0.50 | 0.50 | 0.50 |

What is claimed is:

1. A coating material comprising:
   A) at least one hydroxyl-containing polymer, and
   B) at least one blocked diisocyanate and/or polyisocyanate wherein some of the isocyanate groups are blocked with dialkyl malonate,
   wherein the isocyanate groups of component (B) are blocked with a mixture of dialkyl malonates comprising:
   b1) from about 30 to about 85% by weight of at least one dialkyl malonate of the general formula (I)

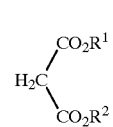

(I)

and/or at least one dialkyl malonate of the general formula (II)

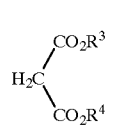

(II)

where
$R^1$, $R^2$, and $R^3$ are each independently selected from aliphatic, cycloaliphatic, or araliphatic secondary alkyl radicals having at least 3 carbon atoms, and
$R^4$ is an aliphatic, cycloaliphatic, aromatic or araliphatic hydrocarbon radical,
and
b2) from about 70 to about 15% by weight of at least one dialkyl malonate other than component (b1),
the sum of components (b1) and (b2) being in each case 100% by weight.

2. The coating material as claimed in claim 1, wherein from about 50 to about 70% by weight of the dialkyl malonate used to block the isocyanate groups of component (B) comprises at least one dialkyl ester of malonic acid of the formula (I) or at least one dialkyl ester of malonic acid of the formula (II).

3. The coating material as claimed in claim 1, wherein at least one of $R^1$, $R^2$, and $R^3$ is selected from the group consisting of alkyl radicals from the esters of 2-propanol, 2-butanols, 2-pentanols, 3-pentanols, 2-hexanols, 3-hexanols, secondary nonanols, secondary decanols and secondary tridecyl alcohols.

4. The coating material of claim 1, wherein at least about 50% of the isocyanate groups of the diisocyanate and/or polyisocyanate are blocked with the dialkyl malonates (b1) and (b2) and the remaining isocyanate groups of the isocyanate have been reacted with at least one hydroxyl-containing compound.

5. The coating material of claim 1, wherein the blocked isocyanate groups present in component (B) are attached to aliphatic or cycloaliphatic radicals.

6. The coating material of claim 1, wherein component (B) comprises a blocked isocyanate based on hexamethylene diisocyanate, isophorone diisocyanate, or a polyisocyanate derived from these diisocyanates and containing an isocyanurate or biuret group.

7. The coating material of claim 1, wherein component (A) has an OH number of from about 40 to about 240 mg KOH/g and/or the ratio of equivalents of the hydroxyl groups of component (A) to the isocyanate groups of component (B) is between about 1.6:1 and about 0.7:1.

8. The coating material of claim 7 wherein component (A) has an OH number of from about 60 to about 150 mgKOH/g.

9. A process for preparing coating materials of claim 1, wherein a hydroxyl-component and a crosslinker component are mixed.

10. A process of coating a substrate, comprising applying the coating material of claim 1 to a substrate.

11. The coating material of claim 1, wherein at least about 90% of the isocyanate groups are blocked with the dialkyl malonates (b1) and (b2) and the remaining isocyanate groups have been reacted with at least one hydroxyl-containing compound.

12. The coating material of claim 1 wherein the ratio of equivalents of the hydroxyl groups of component (A) to the isocyanate groups of component (B) is between about 1.6:1 and about 0.7:1.

13. The coating composition claim 12 wherein the ratio of equivalents of the hydroxyl groups of component (A) to the isocyanate groups of component (B) is between about 1.3:1 and about 0.9:1.

14. A process for preparing diisocyanates and/or polyisocyanates blocked with dialkyl malonates, comprising the steps of:

(a) reacting at least some of the isocyanate groups of the diisocyanate and/or polyisocyanate with a member of the group consisting of dimethyl malonate, diethyl malonate, and mixtures thereof;

(b) transesterifying the reaction product obtained with at least one secondary alcohol having at least 3 carbon atoms selected from a group consisting of aliphatic, cycloaliphatic, and aromatic alcohols and mixtures thereof.

15. The process in claim 14 wherein the reaction product obtained in (a) is further reacted with at least one hydroxy-containing compound before step (b).

16. A process of forming a multicoat paint on a substrate surface comprising the steps of:

(a) applying a pigmented basecoat to the substrate surface;

(b) forming a polymer film from the basecoat applied to the substrate surface;

(c) applying a nonaqueous transparent topcoat to the basecoat; and (d) baking the basecoat and the topcoat together, wherein at least one of the basecoat and the topcoat is a coating material according to claim 1.

* * * * *